June 7, 1966     J. G. WATTS     3,254,590

BARBECUE GRILL CONSTRUCTION

Filed Nov. 7, 1963     2 Sheets-Sheet 1

INVENTOR.
JAMES G. WATTS
BY
*Learman & McCulloch*

June 7, 1966  J. G. WATTS  3,254,590
BARBECUE GRILL CONSTRUCTION
Filed Nov. 7, 1963  2 Sheets-Sheet 2

INVENTOR.
JAMES G. WATTS
BY
Learman & McCulloch

United States Patent Office 3,254,590
Patented June 7, 1966

3,254,590
BARBECUE GRILL CONSTRUCTION
James G. Watts, 206 E. Drake Ave., Auburn, Ala.
Filed Nov. 7, 1963, Ser. No. 322,083
14 Claims. (Cl. 99—340)

This invention relates to cooking apparatus and more particularly to a combination barbecue grill and roaster device composed of a number of separable parts which facilitate the removal of cooked foodstuffs.

One of the principal difficulties encountered in the use of conventional cooking devices of the class to which the invention relates is the removal of cooked foodstuffs without risking burning of the person handling the food. Another commonly encountered difficulty with devices known heretofore is avoiding setting fire to drippings during the cooking process. Still another disadvantage of known devices is the difficulty in cleaning them, particularly following those instances in which drippings have been ignited.

An object of this invention is to provide a cooking device having a plurality of individual components that can be disassembled from one another to facilitate access to cooked food and to simplify cleaning of the components.

Another object of the invention is to provide a device of the kind referred to which is so constructed as to minimize or eliminate completely the likelihood of igniting drippings.

A further object of the invention is to provide a cooking device having a number of separable components which, when assembled, permits food to be roasted, broiled, or both.

Another object of the invention is to provide a cooking device of the character described wherein the components of the device may be assembled with and disassembled from one another without disturbing the food.

Other objects and advantages of the invention will be pointed out specifically or will become apparent from the following description when it is considered in conjunction with the appended claims and the accompanying drawings, in which:

Figure 1:
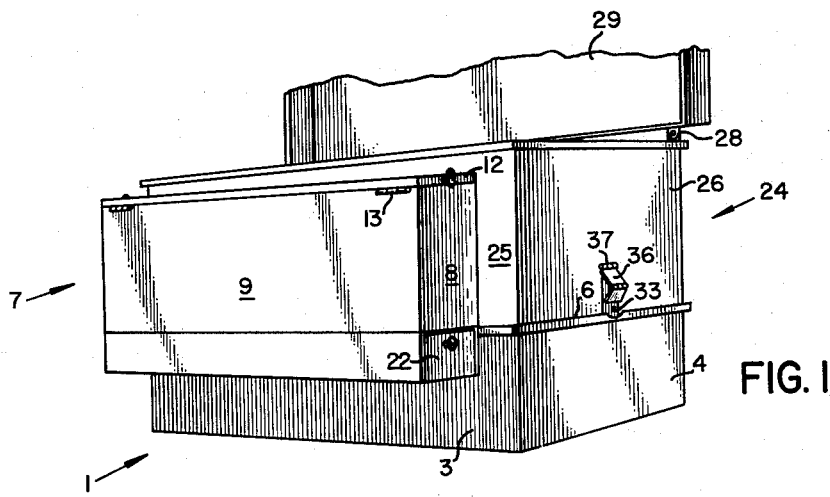
FIGURE 1 is a fragmentary, perspective view of apparatus constructed in accordance with the invention and assembled for use.

Apparatus constructed in accordance with the invention comprises a base pan 1 having a flat, preferably rectangular bottom 2 surrounded by upstanding side and end walls 3 and 4, respectively. The upper end of each wall 3 and 4 terminates in an outwardly bent flange 5 from which extends an upstanding rim 6.

A fuel container 7 preferably is provided for removable mounting on each of the side walls 3. Each container 7 is identical, so only one need be described in detail. Each container comprises a rectangular, hollow receptacle having end walls 8, a side wall 9, a perforated bottom wall 10 and a foraminous wall 11 formed of expanded metal or the like and paralleling the wall 9. The walls 10 and 11 may be formed from one L-shaped sheet of expanded metal if desired. Each container 7 has an open top which may be closed by a cover 12 that is hinged as at 13 to the wall 9.

Means designated by the reference character 14 is provided for mounting each container 7 on its associated side wall and comprises a preferably sheet metal part having a web portion 15 that parallels and is secured to the wall 10, the web terminating at one end in a downwardly turned flange 16 provided with a pair of spaced apart bayonet slots 17. At its other end the web 15 is joined to a downturned flange 18 which terminates at its lower end in a flange 19 that parallels the web 15, but terminates short of the flange 16 by an amount corresponding substantially to the width of the flange 5. Preferably, a side wall 20 and a bottom wall 21 are secured to the members 10 and 18 so as to constitute with the latter a hollow receiver into which ashes may fall through the openings in the container bottom 10. If desired, an open top drawer 22 may be slidably received in the ash receiver to collect the ashes.

The mounting means 14 also includes a pair of headed studs 23 fixed to the inner surface of the side wall 3 and spaced apart a distance to be received in the bayonet slots 17. The construction and arrangement of the mounting means 14 is such that the container 7 may be removably supported on a side wall of the base pan and, when so supported, the web 15 rests upon the upper edge of the rim 6 and the flange 19 bears against the outer surface of the wall 3 to stabilize the container and prevent its rocking outwardly of the pan. When the container is supported on the pan, however, it occupies very little space inwardly of the vertical plane of the inner surface of the wall 3.

The apparatus includes a hollow shell member 24 having side and end walls 25 and 26, respectively, but having an open top and bottom. The size of the shell 24 corresponds substantially to the size of the pan 1 so as to permit the lower edges of the walls 25 and 26 to seat upon the flanges 5. One of the side walls 25 may mount a pair of hinge leaves 27 adjacent its upper end and which may cooperate with similar hinge leaves 28 formed at one side of a cover 29 which may form a lid or closure for the top of the shell 24.

Each side wall 25 of the shell 24 is provided with a rectangular opening 30 that extends upwardly from the lower edge of the wall 25 and is of such length as to correspond substantially to the length of the container 7. The height of the opening 30 corresponds substantially to the height of the side and end walls of the container.

At each end of the container 7 is a channel member 31 having a pair of spaced apart legs 32 between which the edges of the wall 25 adjacent the opening 30 may be received so as to interlock the shell 24 and the container 7. The shell and the container are interlocked with one another by aligning the edges of the wall 25 with the space between the legs 32 while the shell is held above the level of the container, and then lowering the shell to the position in which its lower edge rests upon the flange 5.

The end walls 26 of the shell member are provided with aligned openings 33 in which an elongated skewer or spit 34 may be received. In register with each opening 33, the rim 6 of the base pan is recessed or notched as at 35 to provide a seat for the opposite ends of the spit. Preferably, each end wall 26 of the shell 24 is provided with a cover plate 36 that is hinged as at 37 to the end wall so as to enable the opening 33 to be covered when it is not in use.

To condition the apparatus for use, the containers 7 may be filled with charcoal or other fuel and mounted on the opposite side walls 3 of the pan unit in the manner described, and the fuel ignited. Thereafter, a roast or other article of food to be roasted may be impaled on a skewer such as the spit 34, and the spit supported on the end wall 4 of the pan with the opposite ends of the spit received in and projecting beyond the notches 35. If it is desired to rotate the spit and the food supported thereby, one end of the spit may be inserted in a socket of a conventional motor 38 which may be removably mounted on a bracket 39 fixed to one end wall 4.

When the spit is in place, the shell 24 may be lowered into position in the manner previously described so as to be interlocked with each of the containers 7. The lid 29, if provided, then may be swung to its closed position.

With the shell 24 in place atop the pan 1, heat from the fuel in the containers 7 will be radiated through the foraminous wall 11 into the interior of the enclosure provided by the pan, the shell, and the lid 29. The food supported on the spit will be rotated between the containers 7 so as to cook the food evenly on all sides. Any drippings from the food will fall vertically to the bottom 2 and cannot be ignited by the burning fuel.

Figure 2:
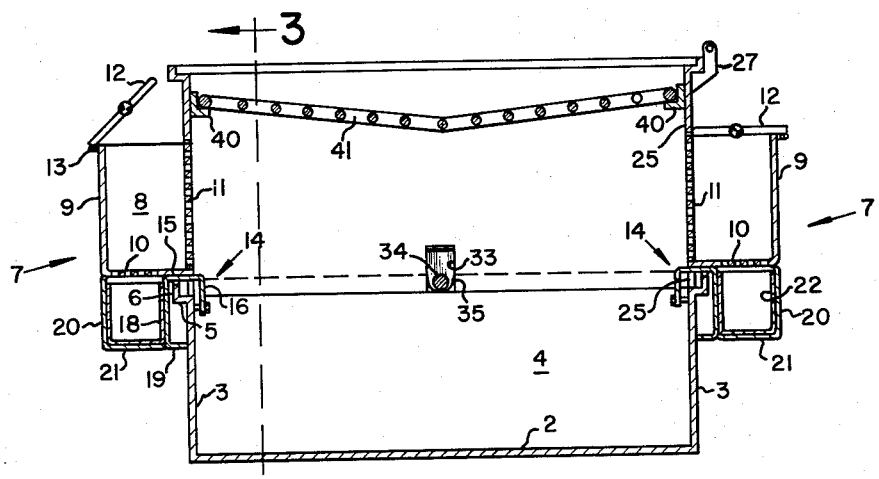
FIGURE 2 is a transverse sectional view of the apparatus illustrated in FIGURE 1, but with the top or cover removed.
Figure 3:
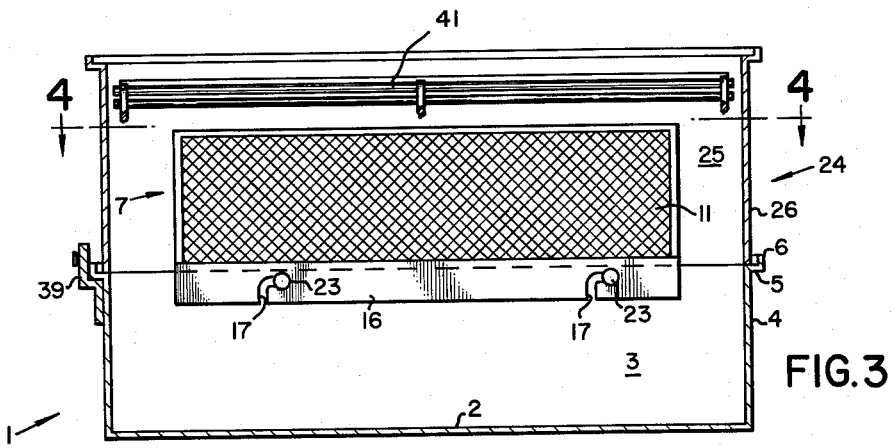
FIGURE 3 is a longitudinal sectional view taken on the line 3—3 of FIGURE 2.
Figure 4:
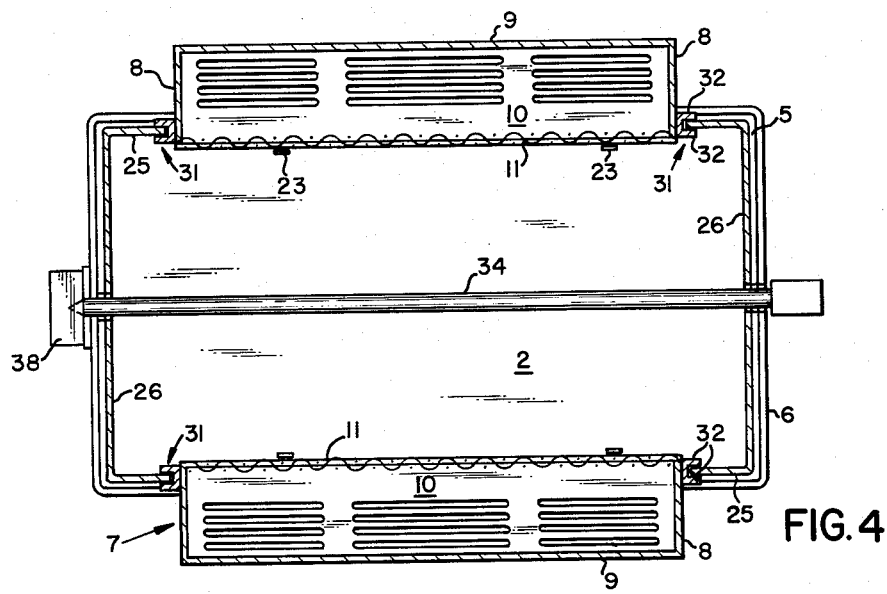
FIGURE 4 is a horizontal sectional view taken on the line 4—4 of FIGURE 3.
Figure 5:
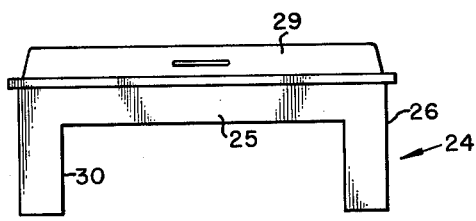
FIGURE 5 is a side elevational view, on a reduced scale, of a portion of the apparatus.

In some cases it may be desirable to broil food as other food is roasted. Apparatus constructed in accordance with the invention includes a pair of supporting brackets 40 mounted on the inner surfaces of the opposite side walls of the shell 24 for removably supporting a grid 41 formed of spaced apart wires. Preferably, the grid is of shallow V shape, concave upwardly, as is indicated in FIGURE 2, so that drippings from the food being broiled will have a tendency to drop from the center of the grid, rather than from its edges.

When the food has been cooked for the proper length of time, the shell 24 may be lifted upwardly so as to remove it from the pan 1. Removal of the shell carries with it the grid 41, and any food supported thereon, but it does not disturb the spit 34 or either container 7. As a result, removal of the spit and the food supported thereon is quite easily effected inasmuch as it requires only vertical lifting of the spit. At no time need a person touch the containers 7 or get very close to them, thereby minimizing the risk of being burned.

It is not necessary that two containers 7 be utilized. Instead, the shell could be supplied with an opening in only one side wall or, if preferred, a closure plate (not shown) may be provided to close either opening 30 when one of the containers 7 is not to be used.

If desired, the apparatus may be used to broil food on the grid 41 without utilizing the spit. In such case, the spit accommodating openings 33 in the end walls 26 may be closed by the members 36.

When the use of the apparatus is concluded, the several parts may be disassembled and cleaned. The ability of the pan and shell to be separated from one another and from the fuel containers greatly facilities the cleaning operation.

The disclosed embodiment is representative of a presently preferred form of the invention, but is intended to be illustrative rather than definitive thereof. The invention is defined in the claims.

I claim:

1. A barbecue grill construction comprising a base pan having a bottom surrounded by upstanding side and end walls; an open bottom unit having side and end walls removably supported on the side and end walls of said base pan, at least one side wall of said unit having an opening therein for the reception of a fuel container; and means on the side wall of said base pan adjacent said one side wall of said unit for mounting said container in said opening in said one side wall of said unit.

2. The construction set forth in claim 1 wherein said end walls of said unit have aligned openings therein for the reception of a spit.

3. The construction set forth in claim 1 including means on selected walls of said unit for supporting a grid.

4. A barbecue grill construction comprising a base pan having a bottom surrounded by upstanding side and end walls; a fuel container having bottom, side and end walls; means on said base pan and on said container mounting the latter on one side wall of said base pan; means at each end of said container forming an outwardly open channel; and an open bottom unit having side and end walls removably supported on the side and end walls of said base pan, at least one side wall of said unit having an opening therein from its bottom edge of such size as to accommodate said container therein with the wall edges adjacent said opening received in said channels to interlock said unit and said container.

5. The construction set forth in claim 4 wherein said end walls of said unit have aligned openings therein for the reception of a spit.

6. The construction set forth in claim 4 including means on selected walls of said unit for supporting a grid.

7. A barbecue grill construction comprising a base pan member having a bottom surrounded by upstanding side and end walls; a hollow shell member open at its top and bottom and having side and end walls substantially the same size as the side and end walls of said pan member; means on one of said members removably supporting said shell member on said pan member; at least one container for fuel; and cooperable means on one of the side walls of said pan member and on said container and supporting the latter on said pan member, the side wall of said shell member adjacent said container having an opening therein extending upwardly from its bottom and of such size as to accommodate said container therein whereby said shell member is removable from said pan member without requiring separation of said container and said pan member.

8. The construction set forth in claim 7 including cooperable means on said container adjacent its ends and on said adjacent side wall for separably interlocking the latter and said container.

9. The construction set forth in claim 7 including aligned openings in the end walls of said shell member extending upwardly from the bottom of the latter, whereby a spit may be accommodated in said aligned openings and be supported wholly by said pan member.

10. The construction set forth in claim 9 wherein the end walls of said pan member are grooved at their upper edges to form seats for said spit.

11. A barbecue grill construction comprising a base pan member having a bottom surrounded by upstanding side and end walls, each of said side walls having at its upper end an outwardly extending flange; a container having bottom, side and end walls forming a hollow fuel receptacle; a mounting member secured to one of the walls of said container and including a first flange located inwardly of one of said side walls of said pan member and a second flange located outwardly of said one of said side walls and in engagement therewith below its flange; and means on said one of said side walls engaging one of said mounting member flanges and removably securing said container to said pan member.

12. The construction set forth in claim 11 wherein said means engages said first flange.

13. The construction set forth in claim 12 wherein said means comprises studs on said one of said walls and bayonet slots in said first flange receiving said studs.

14. The construction set forth in claim 11 wherein the bottom of said container is perforated, and including wall members forming with said mounting member an ash receiver beneath said perforated wall.

References Cited by the Examiner

UNITED STATES PATENTS

| | | | |
|---|---|---|---|
| 747,838 | 12/1903 | Archerd | 126—9 |
| 878,862 | 2/1908 | Boughton | 126—9 |
| 1,893,552 | 1/1933 | King | 312—196 X |
| 1,959,198 | 5/1939 | Conry | 220—4 X |
| 2,173,166 | 9/1939 | Hoelscher | 126—25 |
| 2,526,686 | 10/1950 | Rasmussen | 126—25 |
| 2,814,263 | 11/1957 | Parrish | 126—9 |
| 3,140,651 | 7/1964 | Barnett | 99—339 |

WALTER A. SCHEEL, *Primary Examiner.*

BILLY J. WILHITE, *Assistant Examiner.*